United States Patent [19]

Watkins

[11] Patent Number: 5,101,569
[45] Date of Patent: Apr. 7, 1992

[54] ADJUSTABLE WHEEL MEASURING GAUGE

[76] Inventor: Michael O. Watkins, 1413 Odell St., Great Bend, Kans. 67530

[21] Appl. No.: 530,003

[22] Filed: May 29, 1990

[51] Int. Cl.$^5$ ............................. G01B 3/04; G01B 3/20
[52] U.S. Cl. ........................ 33/203; 33/489; 33/810; 33/600
[58] Field of Search ............... 33/484, 489, 490, 810, 33/811, 203, 600, 542.1, 542

[56] References Cited

U.S. PATENT DOCUMENTS

| | | | |
|---|---|---|---|
| 201,798 | 3/1878 | Larsen | 33/810 |
| 1,737,827 | 12/1929 | Ciliske | 33/203 |
| 2,059,740 | 11/1936 | Minchew | 33/811 |
| 4,129,950 | 12/1978 | Weinhaus. | |
| 4,566,199 | 1/1986 | Gruhler et al. | 33/810 |
| 4,730,399 | 3/1988 | Campbell | 33/600 |
| 4,897,931 | 2/1990 | Goulette | 33/810 |

FOREIGN PATENT DOCUMENTS

| | | | |
|---|---|---|---|
| 1064364 | 5/1954 | France | 33/810 |
| 0716248 | 9/1954 | United Kingdom | 33/810 |

OTHER PUBLICATIONS

Bolt Pattern Gauge Brochure, Wheel Gauge, Inc., 3 pp., undated.

*Primary Examiner*—Thomas B. Will
*Attorney, Agent, or Firm*—John R. Flanagan

[57] ABSTRACT

An adjustable wheel measuring gauge is capable of use in making multiple wheel measurements for identifying wheels. The gauge includes an elongated ruler with a first mating lug and a slider with a second mating lug. The ruler is generally rectangular in cross-section and has a pair of opposite top and bottom faces. Multiple measuring scales in millimeters and inches are provided on the top face. The first mating lug is fixedly attached at one end of the ruler and projects from the bottom face of the ruler. The first lug is adapted for self-centered mating with a desired location on a wheel to be measured. The slider defines a channel open at its opposite ends for receiving the ruler and mounting the slider in a sliding relation on the ruler. The slider has base and window portions bounding opposite sides of the channel and disposed along the opposite faces of the ruler. The window portion overlies the scales on the top face of the ruler. The window portion is transparent and has markings thereon for viewing and reading measurements from the scales through the window portion. The second lug is fixedly attached to the base portion of the slider and projects therefrom so as to extend generally parallel to the first lug on the ruler. The second lug is adapted for self-centered mating with another desired location on the wheel being spaced from the one location thereon through a distance to be measured.

19 Claims, 2 Drawing Sheets

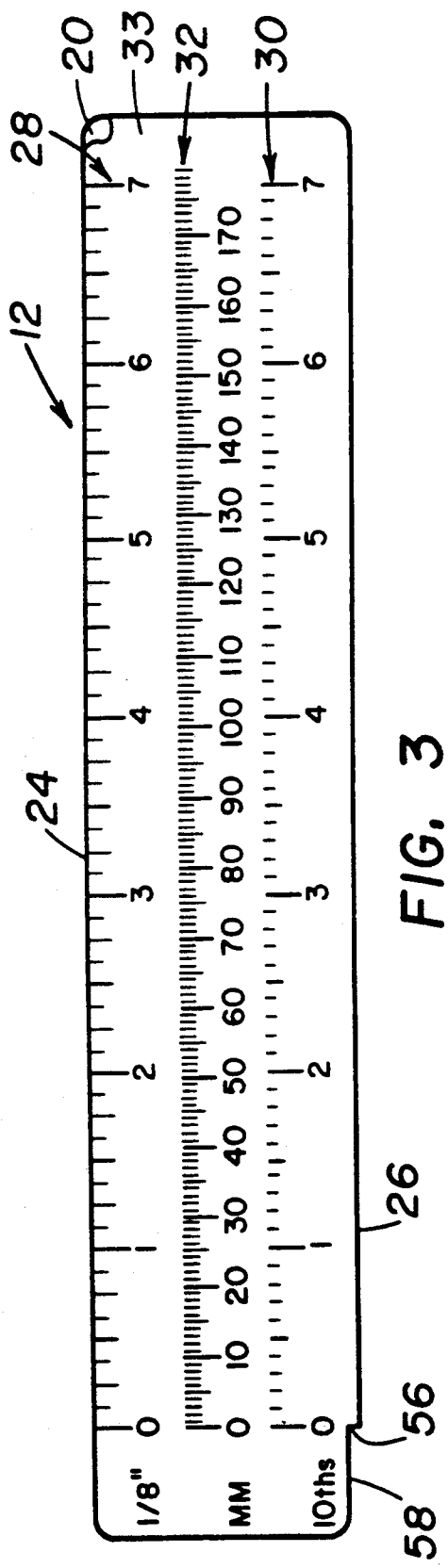
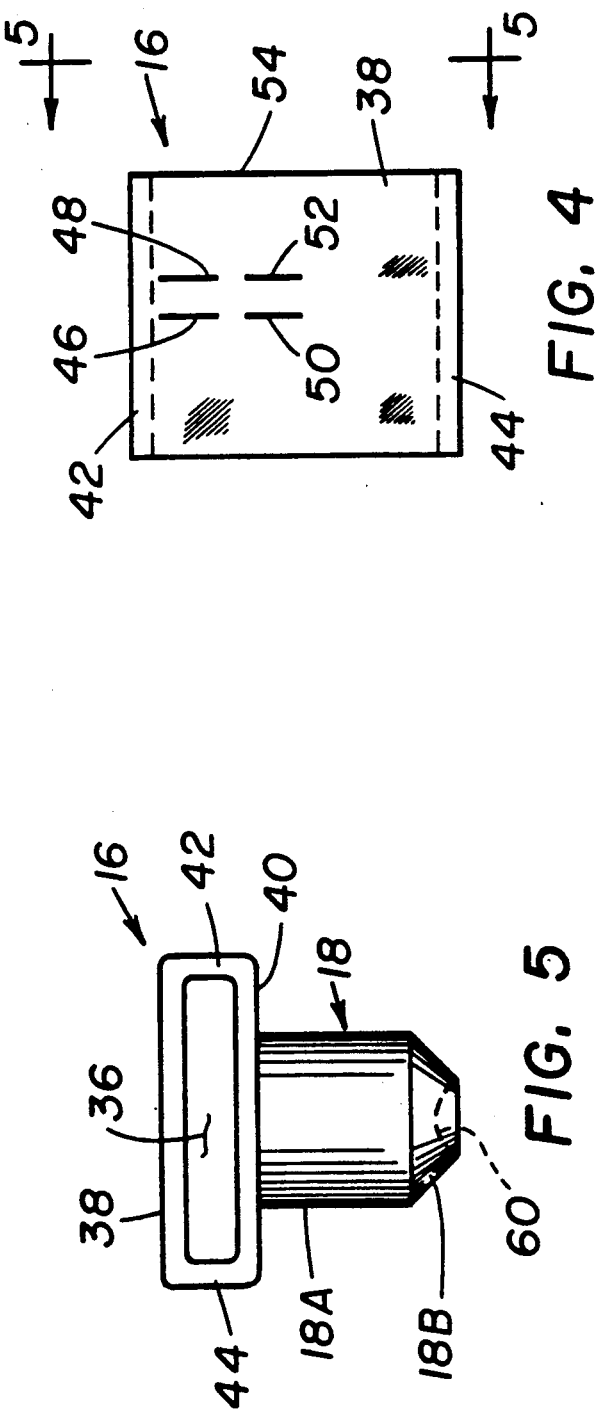

ADJUSTABLE WHEEL MEASURING GAUGE

BACKGROUND OF THE INVENTION

1. Field of the Invention

The present invention generally relates to gauges for determining wheel bolt hole patterns and center hole widths and, more particularly, is concerned with a versatile adjustable wheel measuring gauge for making multiple wheel measurements in order to identifying wheels.

2. Description of the Prior Art

Automotive reclamation yards typically salvage all usable parts from each automobile they dismantle and then place them in separate groups. With respect to wheels, once they are removed and separated from the automobiles it is very difficult to determine what types of vehicles they might have come from by merely inspecting the wheels. There are many different sizes of wheels, types of wheel constructions, and sizes of wheel bolt hole patterns.

While it is easy to distinguish wheels from each other, it is not easy to determine the automobiles on which they might fit. One must first properly identify a given wheel which involves measuring its rim width and diameter, bolt hole pattern size, and center hole width. The rim width and diameter are easy to measure using any standard tape measure or ruler. The bolt hole pattern size and center hole width are more difficult to measure.

A variety of gauges have been proposed in the prior art to assist in determining wheel bolt hole pattern. Representative of such gauges are the ones disclosed in U.S. Pat. Nos. to Weinhaus et al (4,129,950) and Campbell (4,730,399) and a series of bolt pattern gauges marketed by Wheel Gauges, Inc. of Clearwater, Fla.

However, none of the prior art gauges would appear to provide the optimum solution to the problems of accurately and easily determining wheel bolt hole pattern sizes and measuring wheel center hole sizes. Each gauge appears to have one or more of the following shortcomings. The gauges are too complex in construction and operation, too difficult to use, and too expensive to manufacture.

Consequently, a need still exists for a versatile gauge which can quickly and easily be used to measure wheel bolt hole pattern sizes as well as other wheel measurements to identify wheels.

SUMMARY OF THE INVENTION

The present invention provides an adjustable wheel measuring gauge designed to satisfy the aforementioned needs. The adjustable gauge is relatively easy to manufacture and simple to use. It is particularly suited for measuring wheel center hole sizes and either even or odd numbered wheel bolt hole patterns. Further, the gauge can be employed to measure and identify substantially all wheels presently being used.

Accordingly, the present invention is directed to an adjustable wheel measuring gauge capable of use in making multiple wheel measurements for identifying wheels. The adjustable wheel measuring gauge comprises: (a) an elongated ruler with a first mating lug; and (b) a slider with a second mating lug. More particularly, the ruler of the gauge is generally rectangular in cross-section and has a pair of opposite top and bottom faces as the ruler is oriented during use. The first mating lug is fixedly attached at one end of the ruler and projects from the bottom face of the ruler. The first mating lug has an outer portion of a cross-sectional shape adapted for self-centered mating with one point or location on a wheel to be measured.

The slider of the gauge defines a channel open at its opposite ends. The ruler is received through the channel of the slider so as to mount the slider in a sliding relation on the ruler. The slider is composed of an upper window portion and a lower base portion and a pair of side portions interconnecting the base and window portions. The window and base portions are spaced apart and extend parallel to one another and bound the top and bottom of the slider channel.

At least one and preferably multiple measuring scales in inches and millimeters are provided on the ruler. The window portion of the slider overlies the top face of the ruler and the scales viewed therefrom. The window portion is transparent and has a plurality of markings thereon for viewing and reading measurements from the scales through the window portion. The markings are in the form of dark lines being of a larger size than the lines which subdivide the scales. A pair of the markings are provided for each of two of the scales. One marking of the pair is for use when measuring wheels having even number hole patterns and the other marking is for use when measuring wheels having odd number hole patterns.

The second mating lug is fixedly attached to the base portion of the slider and projects therefrom so as to extend generally parallel to the first lug on the ruler. The second mating lug too has an outer portion of a cross-sectional shape adapted for self-centered mating with another point or location on the wheel being spaced from the one point or location thereon through a distance to be measured.

Preferably, the ruler includes a strip of material attached to one of faces thereof which has the measuring scales imprinted thereon such that the scales can be viewed from the top face of the ruler. Preferably, the strip of material is attached on the top face of the ruler. Also, preferably, the strip of material has a coating of florescent material thereon for enhancing viewing in dimly lighted conditions.

Also, the ruler has a pair of opposite side edges interconnecting its opposite faces. One of the scales is used for measuring a center hole of a wheel when the ruler is disposed on one of the side edges. The ruler has a recessed shoulder formed in the one side edge aligned with a zero position of the one scale and for abutting against one side of a wheel center hole. The slider window portion has an edge for abutting against a diametrically opposite side of the wheel center hole and for reading a measurement from the one scale.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is a top plan view of a ruler portion of the adjustable gauge of FIG. 1.

FIG. 4 is a top plan view of a slider portion of the adjustable gauge of FIG. 1.

FIG. 5 is an end elevational view of the slider portion of the adjustable gauge as seen along line 5—5 of FIG. 4.

DETAILED DESCRIPTION OF THE INVENTION

Figure 1:
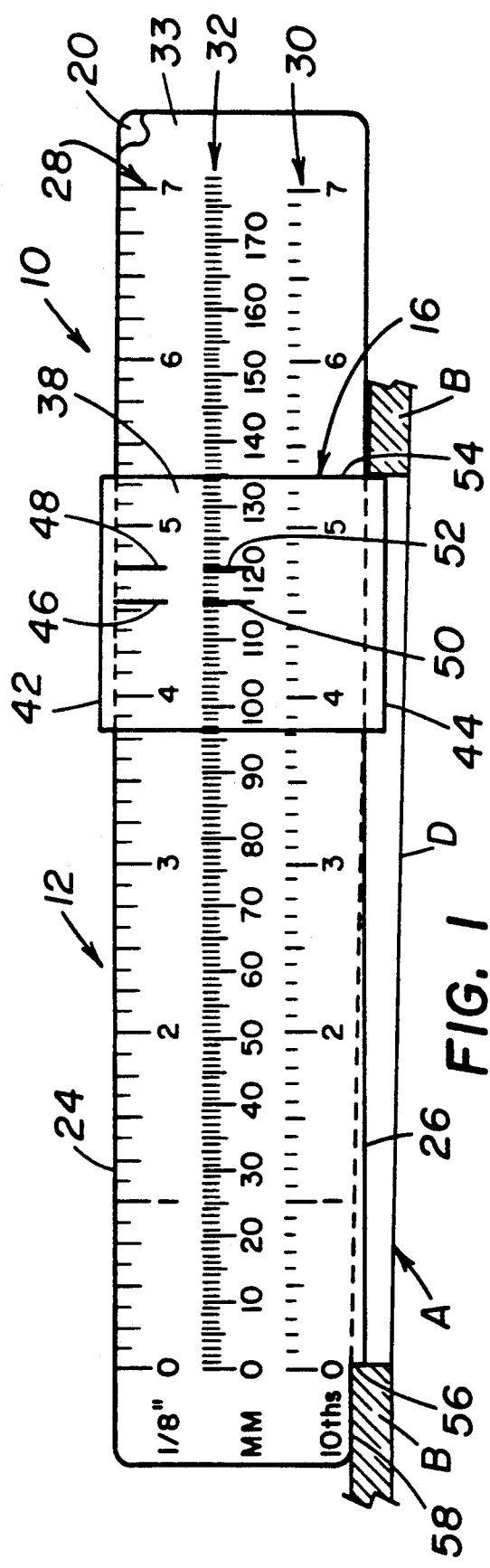
FIG. 1 is a top plan view of an adjustable wheel measuring gauge of the present invention for use in taking measurements for identifying wheels.
Figure 2:
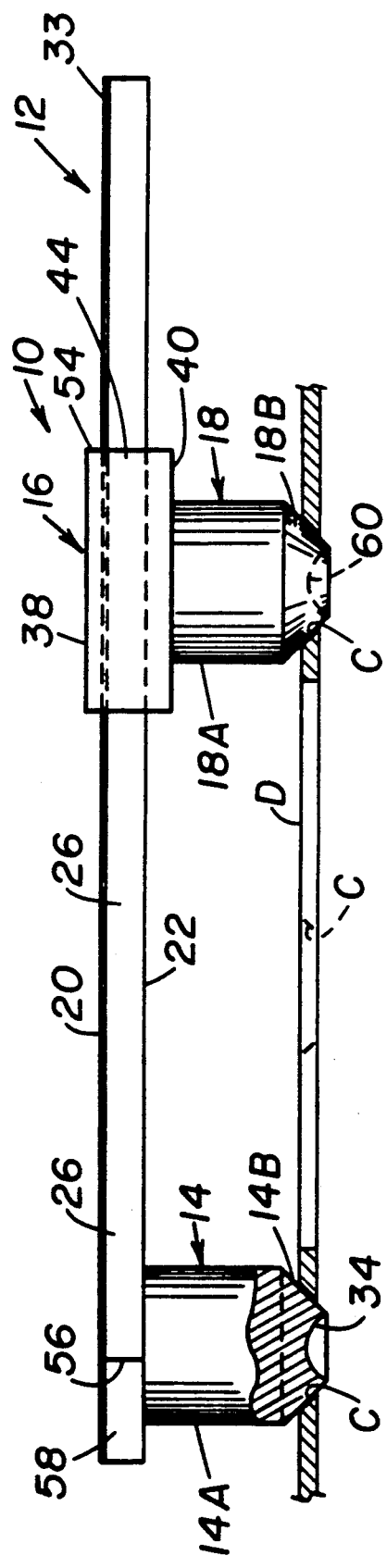
FIG. 2 is a side elevational view of the adjustable gauge of FIG. 1.

Referring to the drawings, and particularly to FIGS. 1 and 2, there is shown an adjustable wheel measuring gauge of the present invention, generally designated 10. The adjustable gauge 10 can quickly and readily be used to make a multiplicity of different wheel measurements for identifying the particular wheel. Examples of the different wheel measurements are wheel center hole sizes and wheel bolt hole pattern sizes. The bolt hole patterns measured can either contain either even or odd numbers of holes. The gauge 10 can advantageously be employed to measure and identify substantially all wheels presently being used.

In its basic components, the adjustable gauge 10 includes an elongated ruler 12 with a first mating lug 14 and a slider 16 with a second mating lug 18. The ruler 2, slider 16 and lugs 14, 18 can be fabricated of any suitable material, one example of which is a stiff transparent plastic known in the trade as plexiglass.

The ruler 12 of the gauge 10, generally rectangular in cross-section, is composed of a pair of opposite generally planar faces 20, 22, which are respectively located on the top and bottom of the ruler 12 as it would be oriented during use of the gauge 10, and a pair of generally planar side edges 24, 26 extending between and intersecting the faces 20, 22.

Referring to FIGS. 1 and 3, a plurality of measuring scales are provided in parallel fashion to one another on the ruler 12 such that they can be viewed from the top face 20 of the ruler 12. A first scale 28, being subdivided in inches and fractions of an inch, such as one-eighths an inch, extends along and adjacent to the one side edge 24 of the ruler 12. A second scale 30, being subdivided in one-tenths of an inch, extends along and adjacent to the opposite side edge 26 of the ruler 12. A third scale 32, being subdivided in centimeters and fractions of centimeters, such as millimeters, extends between the first and second scales 28, 30.

If the ruler 12 is fabricated of transparent material, it can readily be understood that the scales can be imprinted on either the top or bottom faces 20, 22 of the ruler 12 and still be viewed from the top face 20 thereof. Preferably, the scales 28, 30, 32 are printed on a strip 33 of durable material which is laminated to the top face 20 of the ruler 12, although, alternatively, the strip 33 can be laminated to the bottom face 22 as well and still be viewed through the top face 20. Also, preferably, the strip 33 of material has a visible coating of florescent material making it easier to read the scales in dimly lighted conditions.

Referring to FIG. 2, the first mating lug 14 of the gauge 10 is fixedly attached at one end of the ruler 12 and projects from the bottom face 22 of the ruler 12. The first lug 14 has an inner portion 14A of generally cylindrical shape and an outer portion 14B merging from the inner portion 14A and being of a frusto-conical shape. The first mating lug 14 also has a generally concave-shaped recess 34 defined in a bottom surface thereof. Thus, overall the first mating lug 14 has a longitudinal sectional configuration designed for achieving self-centered mating with a given point or location on a wheel to be measured.

Referring to FIGS. 2 and 5, the slider 16 of the gauge 10 defines a channel 36 being open at its opposite ends. The slider channel 36 is of a rectangular shape in cross-section and of a slightly larger size than the rectangular cross-sectional size of the ruler 12. The ruler 12 is received through the slider channel 36 so as to mount the slider 16 for sliding along the ruler 12 between its opposite ends. The slider 16 is composed of opposite window and base portions 38, 40, which are respectively located on the top and bottom of the slider 16 as it would be oriented during use of the gauge 10, and a pair of side portions 42, 44 extending between and interconnecting the window and base portions 38, 40. The side portions 42, 44 of the slider 16 are disposed along the opposite side edges 24, 26 of the ruler 12. The window and base portions 38, 40 are planar, are spaced apart, and extend parallel to one another and bound the top and bottom of the slider channel 36.

Referring to FIGS. 1 and 4, the window portion 38 overlies the three scales 28, 30, 32 on the top face 20 of the ruler 12. Preferably, the window portion 38 of the slider 16 is transparent and has a plurality of markings 46, 48, 50, 52 in the form of dark lines provided thereon. The markings 46, 48, overlie the first scale 28 and the markings 50, 52 overlie the third scale 32. Each of the dark line markings 46, 48, 50, 52 is of a larger size than the lines subdividing the scales 28, 32 so as to be clearly distinguishable from them and thus easy to locate when viewing the respective scales 28, 32 through the window portion 38 to take a reading or measurement from the scales. The markings 46, 50 are employed when measuring wheels having even number hole patterns, such as four-, six-, eight- or ten-hole wheels. The markings 48, 52 are used when measuring wheels having odd number hole patterns, such as five-hole wheels.

There is no marking on the window portion 38 of the slider 16 for taking a reading from the second scale 30. Instead, referring to FIGS. 1 and 3, the right edge 54 of the window portion 38 is used in the place of a marking for taking a measurement. The second scale 30 is employed to measure the center hole A of a wheel D, as fragmentarily shown in FIG. 1. In measuring the w center hole A, the first and second lugs 14, 18 are not used. Instead, the ruler 12 is placed "on edge" across the diameter of the center hole A resting at opposite locations on the annular edge B of the wheel defining the hole A. A recessed shoulder 56 formed by a notch 58 defined at the end of the side edge 26 of the ruler 12 is aligned with the zero position of the second scale 30. The slider 16 is then moved away from the notch 58 until its right edge 54 abuts the opposite location of the annular wheel edge B. The wheel center hole diameter measurement is then read from the second scale 30 at the right edge 54 of the slider window portion 38.

Referring to FIGS. 2 and 5, the second mating lug 18 of the gauge 10 is fixedly attached to the base portion 40 of the slider 16 and projects therefrom, and in effect from the bottom face 22 of the ruler 12 also, so as to extend generally parallel to the first mating lug 14 on the ruler 12. The second mating lug 18 is substantially identical to the first mating lug 14, but is shorter in height since it is mounted to the slider 16. Thus, the second lug 18 has an inner portion 18A of generally cylindrical shape and an outer portion 18B merging from the inner portion 18A and being of a frusto-conical shape. Further, the second lug 18 also has a generally concave-shaped recess 60 defined in a bottom surface thereof. Therefore, the second mating lug 18 overall has a cross-sectional configuration for achieving self-centered mating with another point or location on a wheel being spaced from the one point or location thereon through a distance to be measured.

Referring to FIG. 2, the conical configurations of the outer portions 14B, 18B of the first and second lugs 14, 18 are designed to adapt the lugs to seat in self-centered fashion in the bolt holes C of a wheel D. The concave configurations of the recesses 34, 60 of the first and second lugs 14, 18 are designed to adapt the lugs to seat in self-centered fashion on the outer ends of studs (not shown) on a wheel drum (not shown).

It is thought that the present invention will be understood from the foregoing description and it will be apparent that various changes may be made thereto without departing from its spirit and scope or sacrificing all of its material advantages, the form hereinbefore described being merely preferred or exemplary embodiment thereof.

Having thus described the invention, what is claimed is:

1. An adjustable wheel measuring gauge for making multiple wheel measurements to identify wheels, said adjustable gauge comprising:
    (a) an elongated ruler having a pair of opposite faces and at least one measuring scale on said ruler for viewing from one of said faces;
    (b) a first mating lug fixedly attached at one end of said ruler and projecting from the other of said faces thereof, at least an outer portion of said lug having a cross-sectional shape for self-centering mating with a desired location on a wheel to be measured;
    (c) a slider defining a channel open at its opposite ends for receiving said ruler therethrough and mounting said slider in a sliding relation on said ruler, said slider having window and base portions bounding opposite sides of said channel and disposed along said opposite faces of said ruler, said window portion overlying said scale and being composed of transparent material and having a pair of markings thereon overlying and aligned with said scale for viewing and reading measurements from said scale through said window portion, one marking of said pair being for use when measuring wheels having even number hole patterns and the other marking of said pair being for use when measuring wheels having odd number hole patterns; and
    (d) a second mating lug fixedly attached to said base portion of said slider and projecting therefrom so as to extend generally parallel to said first mating lug on said one end of said ruler, at least an outer portion of said second lug having a cross-sectional shape for self-centered mating with another desired location on the wheel being spaced from the one location thereon through a distance to be measured.

2. The gauge of claim 1 wherein said ruler has a plurality of measuring scales provided in parallel fashion to one another thereon such that they can be viewed from said one face of said ruler.

3. The gauge of claim 2 wherein one of said scales is subdivided in inches and fractions of an inch.

4. The gauge of claim 2 wherein one of said scales is subdivided in centimeters and fractions of centimeters.

5. The gauge of claim 2 wherein said window portion of said slider has a second pair of markings thereon overlying and aligned with at least one other one of said plurality of scales.

6. The gauge of claim 5 wherein all of said markings are in the form of dark lines being of a larger size than lines subdividing said scales.

7. The gauge of claim 2, wherein said ruler has a pair of opposite side edges interconnecting said opposite faces thereof, one of said scales being for measuring a center hole of a wheel when said ruler disposed on one of said side edges, said ruler having a recessed shoulder formed in said one side edge aligned with a zero position of said one scale and for abutting against one side of a wheel center hole, said slider window portion having an edge for abutting against a diametrically opposite side of the wheel center hole and for reading a measurement from said one scale.

8. The gauge of claim 1 wherein said ruler is fabricated of transparent material.

9. The gauge of claim 1 wherein said slider is fabricated of transparent material.

10. The gauge of claim 1 wherein said ruler includes a strip of material attached to one of said faces thereof and having said measuring scale imprinted thereon such that said scale can be viewed from said one face of said ruler.

11. The gauge of claim 10 wherein said strip of material is attached on said one face of said ruler.

12. The gauge of claim 10 wherein said strip of material has a coating of fluorescent material thereon.

13. The gauge of claim 1 wherein said outer portion of each of said first and second mating lugs is of a frusto-conical shape.

14. The gauge of claim 1 wherein each of said first and second mating lugs has an inner portion of generally cylindrical shape extending between and interconnecting said respective outer portion and said respective one of said ruler and slider.

15. The gauge of claim 1 wherein each of said first and second mating lugs has a generally concave-shaped recess defined in a bottom surface on said outer portion of said lug.

16. An adjustable wheel measuring gauge for making multiple wheel measurements to identify wheels, said adjustable gauge comprising:
    (a) an elongated ruler being generally rectangular in cross-section and having a pair of opposite faces and a plurality of measuring scales provided in parallel fashion to one another thereon such that they can be viewed from a top one of said faces of said ruler, on of said scales being subdivided in fractions of an inch and another of said scales being subdivided in fractions of a centimeter;
    (b) a first lug fixedly attached at one end of said ruler and projecting from the other of said faces thereof, at least an outer portion of said lug having a cross-sectional shape for self-centered mating with a desired one location on a wheel to be measured;
    (c) a slider defining a channel receiving said ruler therethrough and mounting said slider in a sliding relation on said ruler, said slider having base and window portions bounding opposite faces of said ruler, said window portion overlying said scale on said one face of said ruler and being composed of transparent material and having a pair of markings thereon respectively overlying and aligned with each of said scales for viewing and reading measurements from said scales through said window portion, one marking of each said pair being for use when measuring wheels having even number hole patterns and the other marking of each said pair for use when measuring wheels having odd number hole patterns; and (d) a second lug fixedly attached to said base portion of said slider and projecting therefrom so as to extend generally parallel to said first lug on said one end of said ruler, at least an outer portion of said second lug having a cross-sectional shape for self-centered mating with another desired location on the wheel being spaced from the one desired location thereon through a distance to be measured.

17. The gauge of claim 16 wherein said ruler includes a strip of material attached to one of said faces thereof and having said measuring scales imprinted thereon such that said scales can be viewed from said top face of said ruler.

18. The gauge of claim 17 wherein said strip of material is attached on said top face of said ruler.

19. The gauge of claim 17 wherein said strip of material has a coating of fluorescent material thereon.

* * * * *